(12) United States Patent
Sjoeholm et al.

(10) Patent No.: US 8,747,040 B2
(45) Date of Patent: Jun. 10, 2014

(54) SCREW ASSEMBLY ELEMENT

(71) Applicant: Volvo Car Corporation, Goeteborg (SE)

(72) Inventors: Niklas Sjoeholm, Goeteborg (SE); Anders Petren, Marstrand (SE)

(73) Assignee: Volvo Car Corporation (SE)

( * ) Notice: Subject to any disclaimer, the term of this patent is extended or adjusted under 35 U.S.C. 154(b) by 0 days.

(21) Appl. No.: 13/673,434

(22) Filed: Nov. 9, 2012

(65) Prior Publication Data

US 2013/0121786 A1 May 16, 2013

(30) Foreign Application Priority Data

Nov. 11, 2011 (EP) .................................. 11188764

(51) Int. Cl.
*E01B 9/12* (2006.01)
(52) U.S. Cl.
USPC ............ 411/337; 411/353; 411/367; 411/999
(58) Field of Classification Search
USPC ................. 411/103, 107, 191, 337, 338, 353, 411/366.1, 367, 927, 999; 16/2.1, 2.3
See application file for complete search history.

(56) References Cited

U.S. PATENT DOCUMENTS

| | | | |
|---|---|---|---|
| 5,244,325 A * | 9/1993 | Knohl | 411/353 |
| 5,290,132 A | 3/1994 | Gnage et al. | |
| 5,807,052 A * | 9/1998 | Van Boven et al. | 411/353 |
| 5,871,319 A * | 2/1999 | Schneider | 411/107 |
| 6,059,503 A | 5/2000 | Johnson | |
| 6,227,783 B1 * | 5/2001 | Salameh | 411/353 |
| 6,280,132 B1 * | 8/2001 | Szczukowski et al. | 411/353 |
| 6,309,156 B1 | 10/2001 | Schneider | |
| 6,585,468 B2 * | 7/2003 | Johnson et al. | 411/353 |
| 6,623,226 B2 * | 9/2003 | Braun et al. | 411/353 |
| 6,685,409 B2 * | 2/2004 | Braun et al. | 411/353 |
| 6,872,040 B2 * | 3/2005 | Deeg et al. | 411/353 |
| 7,771,149 B2 * | 8/2010 | Bauer et al. | 411/533 |
| 2002/0098058 A1 * | 7/2002 | Caldera | 411/353 |
| 2002/0106257 A1 | 8/2002 | Braun et al. | |
| 2003/0194293 A1 * | 10/2003 | Johnson et al. | 411/353 |
| 2006/0056936 A1 | 3/2006 | Ishimaru et al. | |
| 2009/0136318 A1 * | 5/2009 | Hartmann | 411/353 |

FOREIGN PATENT DOCUMENTS

| | | | |
|---|---|---|---|
| CA | 2263025 A1 | 9/1999 |
| DE | 29511400 U1 | 9/1995 |
| EP | 1245842 A2 | 10/2002 |
| WO | 2004099632 A1 | 11/2004 |

OTHER PUBLICATIONS

Extended European Search Report Dated Apr. 20, 2012, Application No. 11188764.2-2424, Applicant Volvo Car Corporation, 4 Pages.

* cited by examiner

*Primary Examiner* — Roberta Delisle
(74) *Attorney, Agent, or Firm* — Brooks Kushman P.C.

(57) ABSTRACT

A screw assembly element in a first part is provided for use when attaching the first part to a second part using a screw. The assembly element comprises a sleeve arranged in a hole in the first part, the sleeve being cylindrical. At least a portion of the first part extends into the inside of the sleeve.

20 Claims, 2 Drawing Sheets

SCREW ASSEMBLY ELEMENT

CROSS-REFERENCE TO RELATED APPLICATIONS

This application claims foreign priority benefits under 35 U.S.C. §119(a)-(d) to European patent application number EP 11188764.2, filed Nov. 11, 2011, which is hereby incorporated by reference in its entirety.

TECHNICAL FIELD

The present disclosure relates to a screw assembly element in a first part for use when attaching said first part to a second part using a screw. The assembly element comprises a sleeve arranged in a hole in said first part and the sleeve is cylindrical.

BACKGROUND

A fixation concept for plastic parts often called "captive screws" are used in production assembly lines in order to reduce assembly time, guarantee quality and minimize the risk of losing screws. The screws are pre-mounted on the part into a compression delimiter, metal sleeve, and will remain until the screw is assembled. Usually the concept for captive screws needs a special screw which is more expensive than a standard screw.

One prior art solution is disclosed in CA 2263025 A1 where a fastening of an assembly part on a carrier part with at least one fastening screw which comprises a screw head with engaging surfaces for a tool, a screw shank, at least one radial projection on the screw shank at a distance from the screw head and a thread at least at the distance of the radial projection from the screw head, with a sleeve with an inner diameter which corresponds at least to the outer diameter of the radial projection and of the thread, which is a narrow location with an inner diameter smaller than the diameter of the radial projection but at least as large as the outer diameter of the screw shank between the screw head and the radial projection, and which at the upper end comprises a head flange and at the lower end a foot flange into which the fastening screw is inserted. The narrow location is snapped over the radial projection of the fastening screw and the screw head is allocated to the outer side of the head flange, with a flexible assembly ring whose inner diameter is smaller than the outer diameter of the head flange and foot flange and which is arranged between the head flange and foot flange on the sleeve, with a through-bore in the assembly part whose inner diameter is at least as large as the outer diameter of the foot flange, into which the sleeve is inserted. The lower side of the head flange is indirectly or directly supported on the upper edge region of the through-bore. However, the inner diameter of the through-bore is dimensioned such that the assembly ring is radially pressed together therein and by way of this clamped in and/or the through-bore comprises an undercut with an inner diameter so that the assembly ring under radial compression and subsequent expansion is pushed through the undercut and by which the assembly ring is retained in the through-bore, and with a threaded bore in the carrier part, into which is screwed the thread of the fastening screw and on whose edge region the foot flange of the sleeve is supported.

A further solution is disclosed in WO 2004/099632 A1. An arrangement is described made of a plastic part and a metal insert with a captive screw, wherein the metal insert can be introduced into a fixing hole of the plastic part in order to define fixing forces transmitted to the plastic part when the plastic part is screwed to another component. The continuous hole of the metal insert has an oval cross-diameter, whereby the largest diametrical dimension is located in the longitudinal direction of the plastic part, in order to compensate tolerances in a longitudinal direction. The continuous hole of the metal insert is provided with two opposite projections in the form of acclivities which keep the fixing screw captive in the plastic part during mounting.

US 2002/0106257 A1 discloses an assembly unit that includes at least one component and at least one screw including a shank having an outer diameter and at least partially including a thread. The head of the screw is designed and arranged to rotate the screw. A supporting surface of the screw faces the component. The component for each screw includes a through hole having a diameter. At least one bush is associated with the at least one screw, and it is designed and arranged to be insertable into the respective through hole. The bush is made of plastic material, and it is designed and arranged to be fixedly connected in the through hole resulting in elastic deformation of the bush. The inner diameter of the bush is slightly more than the outer diameter of the shank. The supporting surface is designed and arranged to operatively contact the component after assembly without contacting the bush to transmit an axial force. The bush, the screw and the component are designed and arranged to be captively connected.

Further, U.S. Pat. No. 6,309,156 B1 discloses a mounting unit that includes a mounting part having an activation side defining an opening leading to a throughbore. A fixing part is insertable into the throughbore and is fastenable to the mounting part, the fixing part including: a head which allows a fastening of the fixing part to the mounting part, a shaft adjoining the head on a top end thereof and being insertable with its bottom portion and with radial play into the throughbore, fixing projections disposed at the bottom portion of the shaft and extending beyond a cross section of the shaft in a plane perpendicular to the shaft longitudinal axis, the fixing projections being effective over an entire circumference of the shaft for fastening the fixing part to the mounting part, and an undercutting space disposed between the head and the fixing projections. A holding sleeve is adapted to be fastened to the mounting part and to surround the shaft and the fixing projections with radial play after the fixing part is inserted into the mounting part. The sleeve includes a holding collar at a top end thereof having a plurality of holding projections distributed across its circumference which allow the fixing part to pass there through unhindered during its insertion into the mounting part. The holding projections are deformable such that they project into the undercutting space in a radially inward direction after an insertion of the fixing part into the mounting part thereby lockingly opposing a loosening of the fixing part with respect to the mounting part.

U.S. Pat. No. 6,059,503 discloses a captivated fastener assembly and method of making it which incorporates a flexible retainer which is designed to allow the fastener to slide axially relative to the work piece while preventing separation thereof. The retainer eliminates the need for specially formed fasteners or work pieces.

SUMMARY

The present disclosure is based on the idea of using stamped and rolled compression delimiters and will allow the use of standard screws.

According to the present disclosure, a screw assembly element in a first part for use when attaching said first part to a second part using a screw comprises a sleeve arranged in a hole in said first part, the sleeve being cylindrical. At least a portion of said first part extends into the inside of the sleeve. With this screw assembly element a standard screw could be used. A standard screw is in this context a screw with a threaded part where the outer diameter of the threaded part is greater than the diameter of the unthreaded part on the screw between the head of the screw Preferably, the sleeve is made from a material harder than said first part. Further, the sleeve is arranged in the hole of said first part such that when a screw is inserted fully in the sleeve the head of the screw abuts the end of the sleeve directly or via a washer. One idea is that said first part should not be compressed when the screw fastens said first part to said second part and thus the material of the sleeve should be harder than the material of said first part. For instance, the sleeve is made of a metal and said first part is made of plastic.

According to one embodiment, the sleeve has at least one notch at at least one end of the sleeve. More preferred is to have at least two notches diametrically opposed. Alternatively, the side of the sleeve has at least one opening/hole or more preferred the sleeve has at least two openings/holes diametrically opposed.

According to one aspect of the present disclosure, the at least one notch or hole in the sleeve is arranged closer to the end where the screw head abuts when in use than the other end.

According to another aspect, the length of the sleeve corresponds to the thickness of the first part adjacent the hole in which the sleeve is arranged.

Preferably, said portion of said first part extending into the inside of the sleeve stretches along the inside of the periphery of the sleeve forming at least a segment of a ring. The screw when inserted in the screw assembly will be more safely arranged in the sleeve the more material there is surrounding the screw.

According to a further aspect of the present disclosure, a screw assembly is provided comprising a screw assembly element, wherein the assembly further comprises a screw which has a head at one end and a threaded part at least at the opposite end and wherein the outer diameter of the threads at said opposite end is larger than the diameter of the screw at least at one part between the head and said threaded part. Preferably, the diameter of the screw at said part between the head and the threaded part corresponds to the inner diameter created by the portion of said first part of the screw assembly element. Also preferred is that the outer diameter of the threaded part of the screw is smaller than the inner diameter of the sleeve.

DETAILED DESCRIPTION

As required, detailed embodiments according to the present disclosure are provided herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
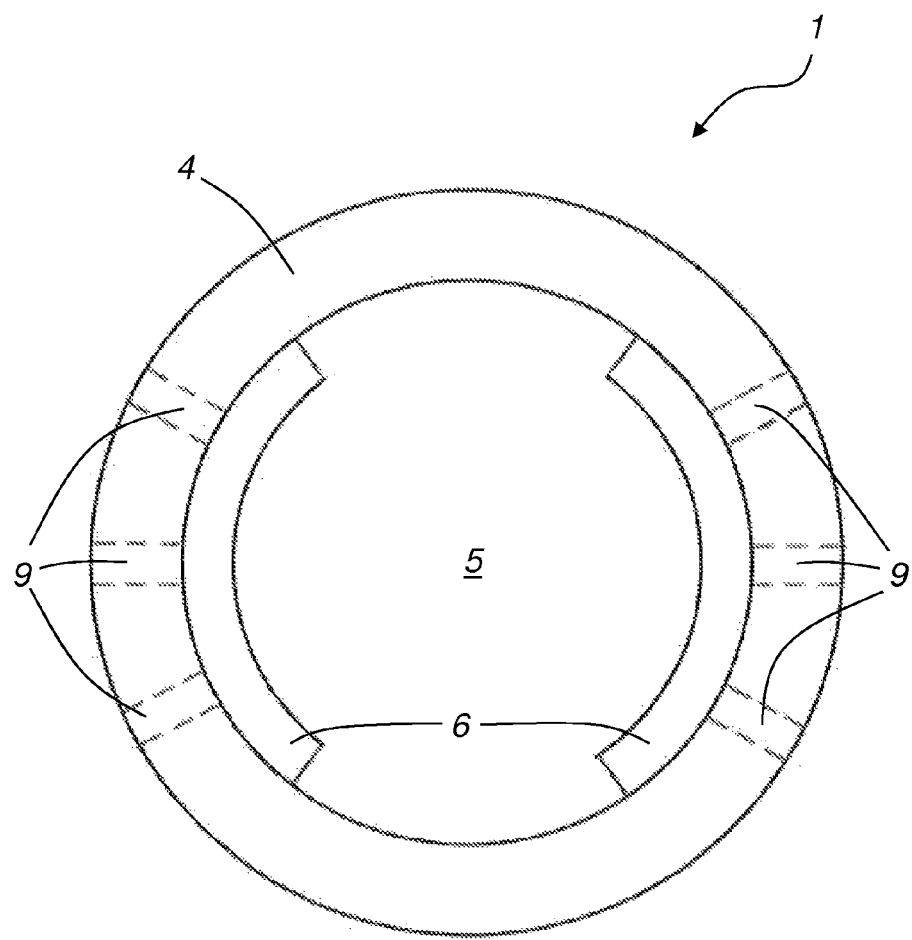
FIG. 1 shows a part of a screw assembly element from one end of a sleeve.
Figure 2:
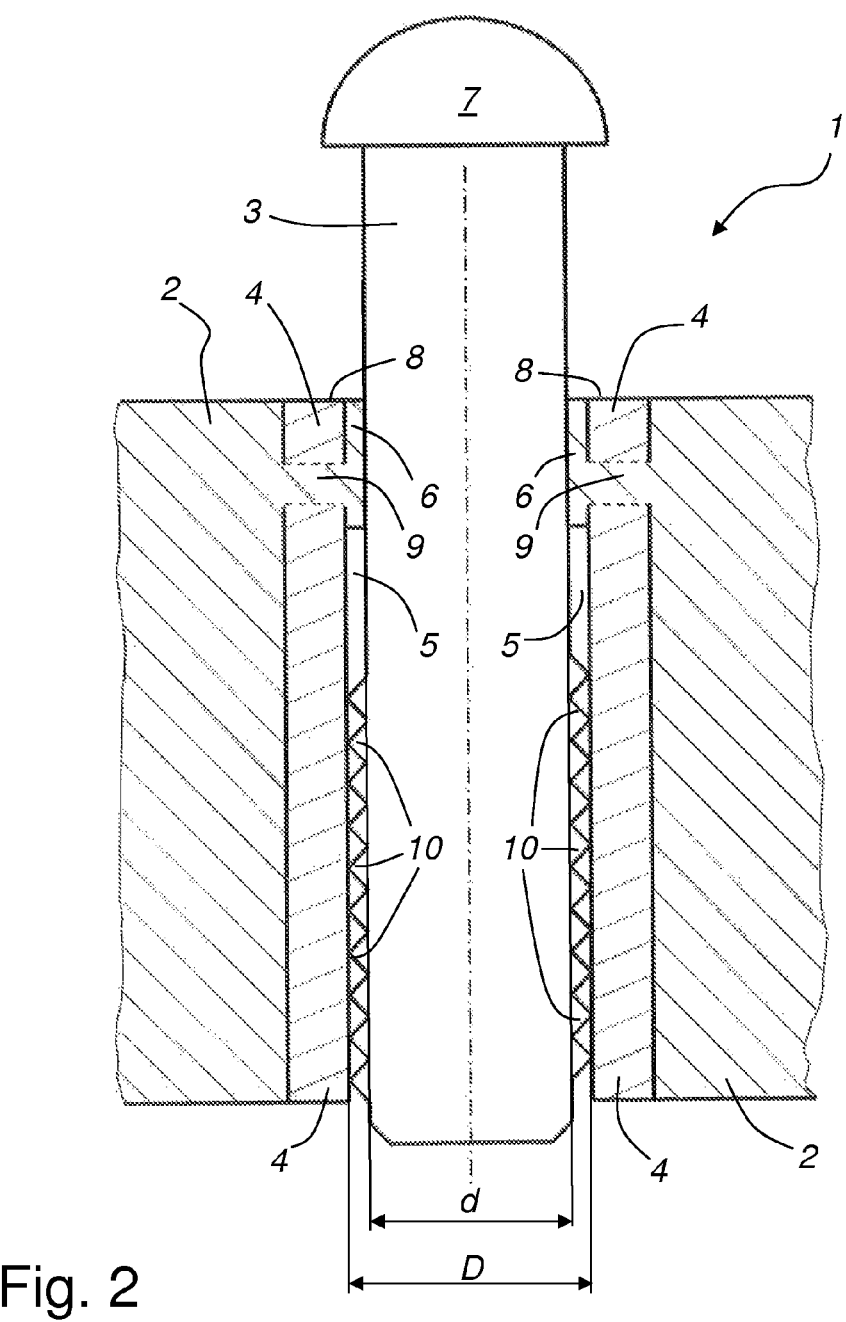
FIG. 2 is a partial cross-section of a screw assembly element.

FIG. 1 and FIG. 2 show an attachment arrangement or assembly including a screw assembly element 1 in a first part 2 for use when attaching said first part 2 to a second part using a screw 3. The assembly element 1 comprises a sleeve 4 arranged in a hole 5 in said first part 2. The sleeve 4 is cylindrical. At least a portion 6 of said first part 2 extends into the inside of the sleeve 4.

The idea of using a sleeve comes from wanting to attach for instance a plastic member to a metal part and thus the sleeve 4 is made from a material harder than the material of said first part 2. In a preferred embodiment the sleeve 4 is made of a metal and said first part 2 is made of a plastic.

In the embodiment shown, the sleeve 4 is arranged in the hole 5 of said first part 2 such that when a screw 3 is inserted fully in the sleeve 4 the head 7 of the screw 3 abuts the end 8 of the sleeve 4 directly. Alternatively, a washer could also be used depending on the relative sizes of the sleeve 4 and the screw 3.

As can be seen in the FIG. 1, the side of the sleeve 4 has three pairs of diametrically opposed openings/holes 9. FIG. 2 further shows that these openings/holes 9 are arranged closer to the end 8 of the sleeve 4 where the screw head 7 abuts when in use than the other end.

In the shown embodiment, the length of the sleeve (4) corresponds to the thickness of the first part 2 adjacent the hole 5 in which the sleeve 4 is arranged. Thus, there will be no load on the first part 2.

In the figures, the portions 6 extending into the inside of the sleeve 4 and stretching along the inside periphery of the sleeve 4 form two segments of a ring. When a screw 3 is inserted, it will therefore be held in a centered position.

The screw 3 has a head 7 at one end and a threaded part at least at the opposite end with an outer diameter D of the threads 10. The outer diameter D at said opposite end is larger than the diameter d of the screw 3 at least at one part between the head 7 and said threaded part. Further, the diameter of the screw 3 at said part between the head 7 and the threaded part corresponds to the inner diameter d created by the portion 6 of said first part 2 of the screw assembly element 1. Also, the outer diameter of the threaded part of the screw 3 is smaller than the inner diameter of the sleeve 4. Assembling the screw assembly involves simply screwing the threaded part of the screw 3 past the portions 6 of the first part 2 and the screw will then be held in position. The tolerances should be such that the screw 1 is relatively easy to slide in the screw assembly element 1.

The screw assembly element 1 according to the present disclosure could for instance be made by placing sleeves 4 on moulding tools that allow for portions 6 to be pressed through the holes 9 in the sleeves 4 upon moulding and thus forming the portions 6 that will later on hold the screws. Afterwards the tools are pulled out and screws can thus be lockingly placed in the screw assembly elements 1. In a preferred embodiment, the sleeves 4 are moulded into the first part 2.

The foregoing is a disclosure of an example practicing the present disclosure. However, it is apparent that modifications and variations will be obvious to one skilled in the art. Inasmuch as the foregoing disclosure is intended to enable one skilled in the art to practice the instant invention, it should not be construed to be limited thereby, but should be construed to include such modifications and variations as fall within the scope of the claims. For instance, instead of holes 9 in the sleeve 4, notches could be made in the sleeve at one end thereof to allow for a portion of the first part to extend into the inside of the sleeve.

What is claimed is:

1. An attachment arrangement for use with a screw, the attachment arrangement comprising:
   a first part that defines a hole; and
   a screw assembly element attached to the first part and configured for use when attaching the first part to a second part using the screw, the screw assembly element including a cylindrical sleeve arranged in the hole of the first part;
   wherein at least a portion of the first part extends into the sleeve such that the at least a portion of the first part extends along at least a portion of an inside periphery of the sleeve.

2. The attachment arrangement according to claim 1 wherein the sleeve is made from a material harder than a material of the first part.

3. The attachment arrangement according to claim 1 wherein the sleeve is arranged in the hole of the first part such that when the screw is inserted fully in the sleeve a head of the screw abuts an end of the sleeve directly or via a washer.

4. The attachment arrangement according to claim 1 wherein the sleeve is made of a metal.

5. The attachment arrangement according to claim 1 wherein the first part is made of a plastic.

6. The attachment arrangement according to claim 1 wherein the sleeve has at least one notch at least at one end of the sleeve.

7. The attachment arrangement according to claim 1 wherein the sleeve has at least two notches at one end of the sleeve, and the at least two notches are diametrically opposed.

8. The attachment arrangement according to claim 1 wherein the sleeve has at least one opening formed on a side of the sleeve.

9. The attachment arrangement according to claim 8 wherein the at least one opening comprises at least two openings that are diametrically opposed.

10. The attachment arrangement according to claim 8 wherein the at least one opening is arranged closer to a first end of the sleeve where a head of the screw abuts when in use than an opposite second end.

11. The attachment arrangement according to claim 1 wherein the first part has a thickness adjacent the hole in which the sleeve is arranged, and the sleeve has a length that corresponds to the thickness of the first part adjacent the hole.

12. The attachment arrangement according to claim 1 wherein the at least a portion of the first part that extends into the sleeve forms at least a segment of a ring.

13. The attachment arrangement according to claim 1 wherein the attachment arrangement comprises the screw, and the screw has a head at one end and a threaded part at least at an opposite end, and wherein an outer diameter of the threaded part is larger than a diameter of the screw at least at one part between the head and the threaded part.

14. The attachment arrangement according to claim 13 wherein the diameter of the screw at the one part between the head and the threaded part corresponds to an inner diameter of the at least a portion of the first part that extends into the sleeve.

15. The attachment arrangement according to claim 13 wherein the outer diameter of the threaded part of the screw is smaller than an inner diameter of the sleeve.

16. An attachment arrangement for use with a screw having a head at one end and a threaded part at least at an opposite end, wherein an outer diameter of the threaded part is larger than a diameter of the screw at least at one part between the head and the threaded part, the attachment arrangement comprising:
   a first part that defines a hole; and
   a screw assembly element attached to the first part and configured for use when attaching the first part to a second part using the screw, the screw assembly element including a cylindrical sleeve arranged in the hole of the first part;
   wherein at least a portion of the first part extends into the sleeve, and the at least a portion of the first part has an inner diameter that corresponds to the diameter of the screw at the one part between the head and the threaded part.

17. The attachment arrangement according to claim 16 wherein the attachment arrangement comprises the screw.

18. An attachment arrangement for use with a screw, the attachment arrangement comprising:
   a first part that defines a hole; and
   a screw assembly element configured for use when attaching the first part to a second part using the screw, the screw assembly element including a cylindrical sleeve arranged in the hole of the first part, the sleeve defining at least one opening on a side of the sleeve;
   wherein the first part extends through the at least one opening of the sleeve.

19. The attachment arrangement according to claim 18 wherein the at least one opening on the side of the sleeve comprises multiple spaced apart openings, and wherein the first part extends through each of the multiple openings.

20. The attachment arrangement according to claim 18 wherein first and second portions of the first part form first and second ring segments, respectively, along an inside periphery of the sleeve.

* * * * *